United States Patent
Horikami et al.

(10) Patent No.: US 9,840,759 B2
(45) Date of Patent: Dec. 12, 2017

(54) ROLLED ROUND STEEL MATERIAL FOR STEERING RACK BAR AND STEERING RACK BAR

(71) Applicant: NIPPON STEEL & SUMITOMO METAL CORPORATION, Tokyo (JP)

(72) Inventors: Sadanori Horikami, Tokyo (JP); Masashi Higashida, Tokyo (JP); Takahiro Okada, Tokyo (JP); Makoto Egashira, Tokyo (JP); Yutaka Neishi, Tokyo (JP); Tatsuya Hasegawa, Tokyo (JP); Hitoshi Matsumoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 203 days.

(21) Appl. No.: 14/779,101

(22) PCT Filed: Feb. 10, 2014

(86) PCT No.: PCT/JP2014/053052
§ 371 (c)(1),
(2) Date: Sep. 22, 2015

(87) PCT Pub. No.: WO2014/167891
PCT Pub. Date: Oct. 16, 2014

(65) Prior Publication Data
US 2016/0083823 A1 Mar. 24, 2016

(30) Foreign Application Priority Data
Apr. 10, 2013 (JP) .................. 2013-081932

(51) Int. Cl.
*C22C 38/18* (2006.01)
*C22C 38/26* (2006.01)
(Continued)

(52) U.S. Cl.
CPC .............. *C22C 38/60* (2013.01); *B62D 3/126* (2013.01); *C21D 8/065* (2013.01); *C21D 9/0068* (2013.01);
(Continued)

(58) Field of Classification Search
None
See application file for complete search history.

(56) References Cited

FOREIGN PATENT DOCUMENTS

CN 1701127 11/2005
CN 1791696 6/2006
(Continued)

*Primary Examiner* — Deborah Yee
(74) *Attorney, Agent, or Firm* — Clark & Brody

(57) ABSTRACT

A rolled round steel material for a steering rack bar, having a chemical composition consisting of C: 0.38 to 0.55%, Si: not more than 1.0%, Mn: 0.20 to 2.0%, S: 0.005 to 0.10%, Cr: 0.01 to 2.0%, Al: 0.003 to 0.10%, and N: 0.003 to 0.03%, with the balance being Fe and impurities, and P being not more than 0.030% in the impurities, and a microstructure consisting of ferrite (F), lamellar pearlite (LP), and cementite (C). The average grain diameter of (F), an area fraction of (LP), and the number of particles of spheroidal cementite (SC) among C are controlled in a region from the surface to a position at ½ radius and in a central part of the material. An average aspect ratio of F is controlled in a region from a surface to a position at ½ radius.

16 Claims, 2 Drawing Sheets

(51) Int. Cl.

| | | |
|---|---|---|
| *C22C 38/28* | (2006.01) | |
| *C22C 38/40* | (2006.01) | |
| *B62D 3/12* | (2006.01) | |
| *F16H 55/26* | (2006.01) | |
| *C22C 38/60* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/22* | (2006.01) | |
| *C22C 38/24* | (2006.01) | |
| *C21D 9/00* | (2006.01) | |
| *C21D 9/28* | (2006.01) | |
| *C22C 38/38* | (2006.01) | |
| *C21D 8/06* | (2006.01) | |

(52) U.S. Cl.
CPC ................ *C21D 9/28* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/40* (2013.01); *C21D 8/06* (2013.01); *C21D 2211/003* (2013.01); *C21D 2211/005* (2013.01); *C21D 2211/009* (2013.01); *C21D 2261/00* (2013.01); *F16H 55/26* (2013.01)

(56) References Cited

FOREIGN PATENT DOCUMENTS

| | | |
|---|---|---|
| CN | 1942692 | 4/2007 |
| CN | 103003462 | 3/2013 |
| JP | 2010-144226 | 7/2010 |
| JP | 2010-168624 | 8/2010 |
| JP | 2011-214130 | 10/2011 |
| JP | 2011-241466 | 12/2011 |
| KR | 10-2005-0050137 | 5/2005 |
| KR | 10-2008-0109351 | 12/2008 |
| WO | 2014/030327 | 2/2014 |

(a)

(b)

(c)

ROLLED ROUND STEEL MATERIAL FOR STEERING RACK BAR AND STEERING RACK BAR

TECHNICAL FIELD

The present invention relates to a rolled round steel material for a steering rack bar (hereafter, may also be referred to as a "rolled round steel material for a rack bar") and to a steering rack bar (hereafter, may also referred to as a "rack bar").

It is noted that the "rolled round steel material" refers to steel material whose cross-section is processed into a circular shape by rolling.

BACKGROUND ART

Among automotive parts, a rack bar, which is used for a steering apparatus, is an important part which steers the travelling direction of the automobile and also serves as a framework to link the left and right wheels so that if it fails, steering operation will be disabled. For this reason, high reliability is required for steel materials to be used as a rack bar.

A rack bar has been produced by subjecting a rolled round steel material of middle carbon steel to thermal refining treatment by quenching and tempering, then to drawing as needed, and further to boring and gear tooth shaping (forming of a tooth shaped part) by machining, and subjecting the tooth shaped part to induction quenching and tempering.

For that reason, it is required for a rack bar that even when subjected to an excessive load, a crack generated in an induction hardened layer should not propagate in the base metal, leading to rupture.

Further, a rack bar is subjected to a deep hole machining in the longitudinal direction of a radially central part.

Therefore, to achieve productivity and characteristics of component at the same time, a round steel material to be used as a starting material for a rack bar is required of excellent machinability when machining a deep hole, and excellent base metal impact characteristics (base metal toughness) for resisting the propagation of a generated crack.

As the steel material to be used for such a rack bar, the present inventors have proposed, for example, the following steel materials.

They proposed, in Patent Document 1, a rolled steel material for induction quenching having: a chemical composition consisting of, in mass %, C: 0.38 to 0.55%, Si: not more than 1.0%, Mn: 0.20 to 2.0%, P: not more than 0.020%, S: not more than 0.10%, Cr: 0.10 to 2.0%, Al: not more than 0.10%, and N: 0.004 to 0.03%, with the balance being Fe and impurities, wherein the value of fn1 which is represented by a Formula [fn1=C+(1/10)Si+(1/5)Mn+(5/22)Cr+ 1.65V−(5/7)S](where C, Si, Mn, Cr, V and S respectively represents content in mass % of each element) is not more than 1.20; and a microstructure consisting of ferrite, lamellar pearlite, and spheroidal cementite, wherein an average grain diameter of ferrite is not more than 10 μm, an area proportion of the microstructure occupied by lamellar pearlite having a lamellar spacing of not more than 200 nm of the entire lamellar pearlite is 20 to 50%, and a number of particles of spheroidal cementite is not less than $4\times10^5/\text{mm}^2$.

It is noted that the rolled steel material for induction quenching may further contain one or more elements selected from Cu, Ni, Mo, Ti, Nb, and V.

They proposed, in Patent Document 2, a rolled steel material for induction quenching having: a chemical composition consisting of, in mass %, C: 0.38 to 0.55%, Si: not more than 1.0%, Mn: 0.20 to 2.0%, P: not more than 0.020%, S: not more than 0.10%, Cr: 0.10 to 2.0%, Al: 0.010 to 0.10%, and N: 0.004 to 0.03%, with the balance being Fe and impurities, wherein the value of Ceq which is represented by a Formula [Ceq=C+(1/10)Si+(1/5)Mn+(5/22)Cr+ 1.65V−(5/7)S](where C, Si, Mn, Cr, V and S respectively represents content in mass % of each element) is not more than 1.20, and a total content of Si, Mn, and Cr is 1.2 to 3.5%; and a microstructure consisting of ferrite, lamellar pearlite, and spheroidal cementite, wherein an average grain diameter of the ferrite is not more than 10 μm, an area proportion of the microstructure occupied by the lamellar pearlite is not more than 20% (including 0%), and a number of particles of spheroidal cementite is not less than $6\times10^5/\text{mm}^2$.

It is noted that the rolled steel material for induction quenching may further contain one or more elements selected from Cu, Ni, Mo, Ti, Nb, and V.

LIST OF PRIOR ART DOCUMENTS

Patent Document

Patent Document 1: JP2011-214130A
Patent Document 2: JP2011-241466A

DISCLOSURE OF THE INVENTION

Problems to be Solved by the Invention

For the rolled steel materials proposed in Patent Documents 1 and 2 and described above, there have been growing demands for further improving base metal toughness for damage prevention, and machinability for machining a deep hole.

The present invention has been made to meet the above described demands and has its object to provide a rolled round steel material which can be suitably used as a starting material for a rack bar to be subjected to induction quenching, and a rack bar using the same. More specifically, it is an object of the present invention to provide a rolled round steel material for a steering rack bar, which can achieve high base metal toughness to halt a crack generated in a rack bar, and further exhibit excellent machinability for machining a deep hole in the longitudinal direction of a radially central part thereof, without necessarily needing expensive elements and even without being subjected to thermal refining treatment, and a steering rack bar using the same.

It is noted that "high base metal toughness" means that the base metal, in a state of rolled steel material, has an impact value of not less than 120 J/cm$^2$ at a test temperature of 25° C. in a Charpy impact test performed by using a standard specimen having a width of 10 mm with a V notch having a notch depth of 2 mm, a notch angle of 45°, and a notch bottom radius of 0.25 mm (hereafter, referred to as a "V-notch Charpy impact test specimen") defined in JIS Z 2242 (2005).

Means for Solving the Problems

The present inventors have conducted various laboratory studies on the means of achieving high base metal toughness in a middle carbon steel without performing thermal refining treatment and also securing excellent machinability in a central part.

To be specific, first, means of improving base metal toughness with reference to a microstructure consisting of ferrite and lamellar pearlite has been studied. As a result of that, the following finding has been obtained.

(A) Elongating ferrite finely and in a direction parallel with the rolling direction, further transforming cementite in lamellar pearlite into spheroidal cementite such that the lamellar pearlite is less than a specific proportion and spheroidal cementite is contained by not less than a certain amount will increase the resistance to a crack which propagates in a cross-section perpendicular to the rolling direction, thus making it possible to improve base metal toughness.

Next, effect of structure on the machinability when machining a deep hole has been investigated with reference to microstructure consisting of ferrite and lamellar pearlite. As a result, the following finding has been obtained.

(B) When the amount of spheroidal cementite excessively increases in the microstructure, chip treatability deteriorates and thereby cutting resistance increases, thus resulting in deterioration of machinability. On the other hand, when a structure includes not less than a specific proportion of lamellar pearlite, and in which the amount of spheroidal cementite is suppressed to be less than a specific amount, the chip treatability improves and consequently cutting resistance decreases, thereby improving machinability.

To improve base metal toughness and machinability, further, the effect of component element has been studied. As a result, the following finding has been obtained.

(C) S combines with Mn to form MnS, and is elongated in the longitudinal direction of steel material (direction parallel with the rolling direction), thereby improving toughness. Furthermore, since when a specific amount of S is contained, the chip treatability improves and thereby cutting resistance decreases, the machinability improves.

Then, based on the findings (A) to (C), further detailed study has been conducted. As a result, the following important findings have been obtained.

(D) As a rolled round steel material for a steering rack bar, the area where base metal toughness for damage prevention is required is a region from a surface of the round steel material to a position at ½ radius. Therefore, if the microstructure in the region is composed of ferrite which is elongated finely and in the direction parallel with the rolling direction, lamellar pearlite which is limited to be not more than a specific proportion, and not less than a specific amount of spheroidal cementite, it is possible to obtain enough base metal toughness for damage prevention.

(E) On the other hand, if in a central part of a rolled round steel material whose microstructure consists of ferrite, lamellar pearlite, and spheroidal cementite, the lamellar pearlite is contained in not less than a specific proportion, and the spheroidal cementite is contained in less than a specific amount, excellent machinability can be obtained.

The present invention has been completed based on the above described findings, and its gist lies in the rolled round steel material for a steering rack bar, and the steering rack bar to be described below.

(1) A rolled round steel material for a steering rack bar, having: a chemical composition consisting of, in mass %, C: 0.38 to 0.55%, Si: not more than 1.0%, Mn: 0.20 to 2.0%, S: 0.005 to 0.10%, Cr: 0.01 to 2.0%, Al: 0.003 to 0.10%, N: 0.003 to 0.03%, Cu: 0 to 1.0%, Ni: 0 to 3.0%, Mo: 0 to 0.50%, Ti: 0 to 0.10%, Nb: 0 to 0.10%, V: 0 to 0.30%, Ca: 0 to 0.005%, and Pb: 0 to 0.30%, with the balance being Fe and impurities, and P being not more than 0.030% in the impurities; and a microstructure consisting of ferrite, lamellar pearlite, and cementite, wherein in a cross-section perpendicular to a rolling direction: in a region from a surface to a position at ½ radius, an average grain diameter of the ferrite is not more than 10 μm, an area fraction of the lamellar pearlite is less than 20%, and a number of particles of spheroidal cementite among the cementite is not less than $4 \times 10^5/mm^2$; and in a central part, an area fraction of the lamellar pearlite is not less than 20%, and a number of particles of spheroidal cementite among the cementite is less than $4 \times 10^5/mm^2$, and wherein in a cross-section including a center line of the round steel material and parallel to the rolling direction: in a region from a surface to a position at ½ radius, an average aspect ratio of the ferrite grains is not less than 3.

(2) The rolled round steel material for a steering rack bar according to the above item (1), containing one or more elements selected from, in mass %, Cu; 0.10 to 1.0%, Ni: 0.10 to 3.0%, and Mo: 0.10 to 0.50%.

(3) The rolled round steel material for a steering rack bar according to the above item (1) or (2), containing one or more elements selected from, in mass %, Ti: 0.010 to 0.10%, Nb: 0.010 to 0.10%, and V: 0.010 to 0.30%.

(4) The rolled round steel material for a steering rack bar according to any of the above items (1) to (3), containing one or more elements selected from, in mass %, Ca: 0.0005 to 0.005%, and Pb: 0.05 to 0.30%.

(5) A steering rack bar, fabricated by using any of the rolled round steel materials for a steering rack bar according to any of the above items (1) to (4) in a non-thermally refined state.

"Impurities" refer to those which are mixed from ores and scraps as the raw material or manufacturing environments when steel material is industrially manufactured.

"Spheroidal cementite" refers to cementite whose ratio of the major diameter L to the minor diameter W (L/W) is not more than 2.0.

"Central part" refers to an area located within a distance up to ¼ radius from the center.

"Used in a non-thermally refined state" means that something is used without being subjected to quenching and tempering, so-called "thermal refining treatment".

Advantageous Effects of the Invention

Since the rolled round steel material for a steering rack bar of the present invention has high base metal toughness of an impact value of not less than 120 J/cm² at a test temperature of 25° C. in a Charpy impact test performed by using a V-notch Charpy impact test specimen, and further exhibits excellent machinability for machining a deep hole in a central part thereof even without necessarily needing expensive V to be contained and in a state of rolled round steel material even without being subjected to thermal refining treatment, it is suitable for use as the starting material for a steering rack bar.

Further, the steering rack bar of the present invention can be obtained by using the above described rolled round steel material for a steering rack bar in a non-thermally refined state.

BRIEF DESCRIPTION OF THE DRAWINGS

In FIG. 2, (a) shows a front view (general view), (b) a side view, and (c) an enlarged view of a tooth shaped part in the "A"-"A" cross-section. Note that the unit of dimension is "mm" in (a) to (c) in FIG. 2.

MODE FOR CARRYING OUT THE INVENTION

Figure 1:
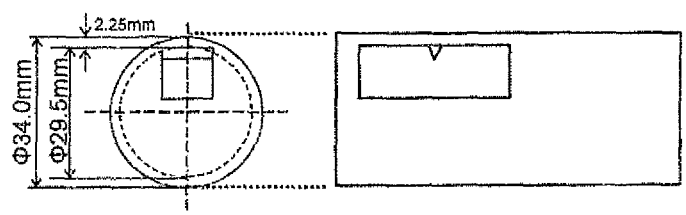
FIG. 1 schematically illustrates the orientation of a notch of a V-notch Charpy impact test specimen taken from a steel bar in Example 1.

Hereafter, each requirement of the present invention will be described in detail. Note that "%" of the content of each element means "mass %" in the description below.

1. Chemical composition:

C: 0.38 to 0.55%

C (carbon) has the effect of improving the strength and induction hardenability of steel, and the strength of a hardened layer formed by induction quenching. To achieve these effects, C is contained in an amount of not less than 0.38%. On the other hand, when C content exceeds 0.55%, base metal toughness deteriorates. Therefore, C content is specified to be 0.38 to 0.55%. Note that, to stably achieve the above described effects, C content is preferably not less than 0.40%. Moreover, C content is preferably not more than 0.51%.

Si: not more than 1.0%

Si (silicon) is a deoxidizing element and is also an element that increases the strength of ferrite by solid solution strengthening. However, when Si content exceeds 1.0%, the machinability deteriorates thereby making it difficult to machine a deep hole. Therefore, Si content is specified to be not more than 1.0%. Si content is preferably not more than 0.8%.

Note that since Al to be described later has also deoxidizing effect, there is no need of setting a lower limit for Si content. However, to reliably ensure strength by utilizing the solid solution strengthening effect of Si as described above, Si content is preferably not less than 0.03%, and more preferably not less than 0.10%.

Mn: 0.20 to 2.0%

Mn (manganese) has the effect of combining with S to form MnS and thereby improving machinability, especially chip treatability when machining a deep hole, and further, elongated MnS is effective in suppressing the propagation of crack and thereby improving toughness. Moreover, Mn is an element that is effective in improving induction hardenability and also an element that increases the strength of ferrite through solid solution strengthening. To achieve these effects, Mn is contained in an amount of not less than 0.20%. On the other hand, if Mn is contained in an amount of more than 2.0%, machinability of steel deteriorates thereby making it difficult to machine a deep hole. Therefore, Mn content is specified to be 0.20 to 2.0%. Note that to stably achieve the above described effects while suppressing the alloying cost low, Mn content is preferably not less than 0.40%, and is also preferably not more than 1.50%.

S: 0.005 to 0.10%

S (sulfur) is an important element in the present invention. S has the effect of combining with Mn to form MnS, thereby improving machinability, especially chip treatability when machining a deep hole, and further, elongated MnS has the effect of suppressing the propagation of crack and thereby improving toughness. To achieve these effects, S is contained in an amount of not less than 0.005%. On the other hand, when S content increases thus forming too much amount of MnS, toughness of steel will be deteriorated on the contrary. Therefore, S content is specified to be 0.005 to 0.10%. Note that S content is preferably not less than 0.010%, and more preferably not less than 0.015%. Moreover, S content is preferably not more than 0.08%.

Cr: 0.01 to 2.0%

Since Cr (chromium) is an element that is effective in improving induction hardenability and also an element that increases the strength of ferrite through solid solution strengthening, Cr needs to be contained in an amount of not less than 0.01%. However, if Cr content exceeds 2.0%, machinability of steel deteriorates thereby making it difficult to machine a deep hole. Therefore, Cr content is specified to be 0.01 to 2.0%. Note that Cr content is preferably not less than 0.05%, and more preferably not less than 0.10%. Further, Cr content is preferably not more than 1.8%.

Al: 0.003 to 0.10%

Al (aluminum) has a deoxidizing effect and also combines with N in steel to form AlN, thereby contributing to the refinement of base metal structure. To achieve these effects, Al is contained in an amount of not less than 0.003%. On the other hand, when Al content exceeds 0.10%, induction hardenability of steel is significantly deteriorated, and further, deterioration of base metal toughness is caused. Therefore, Al content is specified to be 0.003 to 0.10%. Note that Al content is preferably not more than 0.08%. On the other hand, in a viewpoint of preventing the coarsening of grain during induction quenching, to ensure the formation of AlN described above, Al content is preferably not less than 0.005%, and more preferably not less than 0.010%.

N: 0.003 to 0.03%

N (nitrogen) combines with Al in steel to form AlN, thereby contributing to the refinement of base metal structure. To achieve these effects, N is contained in an amount of not less than 0.003%. On the other hand, when N content exceeds 0.03%, deterioration of base metal toughness will result. Therefore, N content is specified to be 0.003 to 0.03%. Note that N content is preferably not less than 0.004%, and is also preferably not more than 0.02%.

One of the rolled round steel materials for a steering rack bar of the present invention has a chemical composition consisting of the above described elements of C to N, with the balance being Fe and impurities, wherein P in the impurities is not more than 0.030%.

P: not more than 0.030%

P (phosphor) is contained in steel as an impurity and causes grain boundary segregation and central segregation, thereby causing deterioration of base metal toughness. Particularly, when P content exceeds 0.030%, the deterioration of base metal toughness will become significant. Therefore, P content is specified to be not more than 0.030%. Note that P content is preferably not more than 0.020%.

A rolled round steel material for a steering rack bar of the present invention may contain, in addition to the above described each element, one or more elements selected from Cu, Ni, Mo, Ti, Nb, V, Ca, and Pb.

Hereafter, working effects of the above described Cu, Ni, Mo, Ti, Nb, V, Ca, and Pb, which are optional elements, and reasons to limit their contents will be described.

Since Cu, Ni, and Mo have the effects of improving induction hardenability of steel and yet further improving base metal toughness thereof, these elements may be contained to achieve those effects. Hereafter, detailed description will be made on this point.

Cu: 0 to 1.0%

Since Cu (copper) has the effects of improving induction hardenability of steel and also improving base metal toughness thereof, Cu may be contained for improvement of base metal toughness. However, when Cu content exceeds 1.0%, machinability of steel will deteriorate, making it difficult to machine a deep hole. Therefore, the content of Cu, if contained, is specified to be not more than 1.0%. Note that Cu content is preferably not more than 0.80%.

On the other hand, to stably achieve the effect of Cu of improving base metal toughness, Cu content is preferably not less than 0.05%, and more preferably not less than 0.10%.

Ni: 0 to 3.0%

Since Ni (nickel) has the effects of improving induction hardenability of steel and also improving base metal toughness thereof, Ni may be contained for improvement of base metal toughness. However, when Ni content exceeds 3.0%, machinability of steel will deteriorate, making it difficult to machine a deep hole. Therefore, the content of Ni, if contained, is specified to be not more than 3.0%. Note that Ni content is preferably not more than 2.0%.

On the other hand, to stably achieve the effect of Ni of improving base metal toughness, Ni content is preferably not less than 0.05%, and more preferably not less than 0.10%.

Mo: 0 to 0.50%

Since Mo (molybdenum) has the effects of improving induction hardenability of steel and also improving base metal toughness thereof, Mo may be contained for improvement of base metal toughness. However, when Mo content exceeds 0.50%, machinability of steel will deteriorate, making it difficult to machine a deep hole. Therefore, the content of Mo, if contained, is specified to be not more than 0.50%. Note that Mo content is preferably not more than 0.40%.

On the other hand, to stably achieve the effect of Mo of improving base metal toughness, Mo content is preferably not less than 0.05%, and more preferably not less than 0.10%.

Note that the above described Cu, Ni, and Mo may be contained in only one element thereof, or two or more elements in combination. Note that although the total content of these elements may be 4.50%, it is preferably not more than 3.20%.

Since Ti, Nb, and V have the effect of refining grains, these elements may be contained to achieve those effects. Hereafter, detailed description will be made on this point.

Ti: 0 to 0.10%

Since Ti (titanium) has the effect of combining with C or N in steel to form carbide, nitride, or carbo-nitride, thereby refining grains during hot rolling or induction quenching, Ti may be contained for grain refinement. However, when Ti is contained in an amount of more than 0.10%, although refinement of grain can be expected, deterioration of toughness will result. Therefore, the content of Ti, if contained, is specified to be not more than 0.10%. Note that in the viewpoint of suppressing toughness deterioration, Ti content is preferably not more than 0.08%.

On the other hand, to stably achieve the grain refinement effect of Ti, above all, the grain refinement effect thereof during induction quenching, Ti content is preferably not less than 0.010%, and more preferably not less than 0.015%.

Nb: 0 to 0.10%

Nb (niobium) has the effect of combining with C or N in steel to form carbide or carbo-nitride, and thereby refining grains. Moreover, Nb also has the effect of increasing the strength of steel. However, when Nb content exceeds 0.10%, the effect thereof will be saturated, thereby not only causing increase of cost, but also leading to deterioration of toughness. For that reason, the content of Nb, if contained, is specified to be not more than 0.10%. Note that Nb content is preferably not more than 0.08%.

On the other hand, to stably achieve the grain refinement effect of Nb, Nb content is preferably not less than 0.010%, and more preferably not less than 0.015%.

V: 0 to 0.30%

V (vanadium) has the effect of combining with C or N in steel to form carbide or carbo-nitride, and thereby refining grains. Moreover, V also has the effect of increasing the strength of steel. However, when V content exceeds 0.30%, the effect thereof will be saturated, thereby not only causing increase of cost, but also leading to deterioration of toughness. For that reason, the content of V, if contained, is specified to be not more than 0.30%. Note that V content is preferably not more than 0.25%.

On the other hand, to stably achieve the grain refinement effect of V, V content is preferably not less than 0.010%, and more preferably not less than 0.020%.

Note that the above described Ti, Nb, and V may be contained in only one element thereof, or two or more elements in combination. Note that although the total content of these elements may be 0.50%, it is preferably not more than 0.41%.

Since if Ca and Pb are contained, further improvement of machinability can be expected, these elements may be contained to achieve this effect. Hereafter, detailed description will be made on this point.

Ca: 0 to 0.005%

Ca (calcium) has the effect of improving machinability of steel. For this reason, Ca may be contained as needed. However, when Ca content exceeds 0.005%, hot workability deteriorates, thereby reducing productivity. Therefore, the content of Ca, if contained, is specified to be not more than 0.005%. Ca content is preferably not more than 0.0035%.

On the other hand, to stably achieve the machinability improvement effect of Ca, Ca content is preferably not less than 0.0005%.

Pb: 0 to 0.30%

Pb (lead), as well as Ca, has the effect of improving machinability of steel when contained therein. For this reason, Pb may be contained as needed. However, when Pb content exceeds 0.30%, the aforementioned machinability improvement effect will be saturated, and hot workability will excessively deteriorate, thus making the production thereof difficult. Therefore, the content of Pb, if contained, is specified to be not more than 0.30%.

On the other hand, to stably achieve the machinability improvement effect, Pb content is preferably not less than 0.05%.

2. Microstructure:

The microstructure of a rolled round steel material for a steering rack bar of the present invention consists of ferrite, lamellar pearlite, and cementite.

In the case of a rolled round steel material for a steering rack bar of the present invention, in a cross-section perpendicular to a rolling direction, when an average grain diameter of ferrite in a region from a surface of the round steel material to a position at ½ radius is more than 10 µm, it is difficult to obtain targeted base metal toughness. Therefore, the average grain diameter of ferrite is specified to be not more than 10 µm. Note that the average grain diameter of ferrite is preferably not more than 8 µm.

Although the average grain diameter of ferrite is preferably as small as possible in enhancing grain refinement, forming grains of submicron order requires special processing condition or equipment, and therefore is difficult to be industrially realized. Therefore, a lower limit of the average grain diameter of ferrite as the size that can be industrially realized is about 1 μm.

The above described average grain diameter of ferrite may be determined, for example, by respectively determining ferrite grain diameters at three locations including a position at 1 mm from the surface of the rolled round steel material, a position at ¼ radius from the surface (hereafter, referred to as "R/4 position", "R" referring to radius, and the same applying hereafter), and a position at ½ radius from the surface (hereafter, referred to as "R/2 position"), and thereafter taking an arithmetic average of the ferrite grain diameters at the three locations.

In the case of a rolled round steel material for a steering rack bar of the present invention, when in a cross-section perpendicular to a rolling direction, the area fraction of lamellar pearlite in a region from a surface to a position at ½ radius is not less than 20%, deterioration of base metal toughness will result. Therefore, the area fraction of lamellar pearlite is specified to be less than 20%. The area fraction of lamellar pearlite is preferably not more than 15%, and may also be 0%.

The area fraction of lamellar pearlite may be determined, for example, by respectively determining area fractions of lamellar pearlite at three locations including a position at 1 mm from the surface of the rolled round steel material, an R/4 position, and an R/2 position, and thereafter taking an arithmetic average of the area fractions of lamellar pearlite at the three locations.

In the case of a rolled round steel material for a steering rack bar of the present invention, when in a cross-section perpendicular to the rolling direction, the number of particles of spheroidal cementite in a region from the surface to a position at ½ radius is less than $4 \times 10^5/\text{mm}^2$, deterioration of base metal toughness will result. Therefore, the above described number of particles of spheroidal cementite is specified to be not less than $4 \times 10^5/\text{mm}^2$. The number of particles of spheroidal cementite is preferably not less than $5 \times 10^5/\text{mm}^2$ and is also preferably not more than $1.0 \times 10^{12}/\text{mm}^2$.

The number of particles of spheroidal cementite may be determined, for example, by respectively determining numbers of particles of spheroidal cementite at three locations including a position at 1 mm from the surface of the rolled round steel material, an R/4 position, and an R/2 position, and thereafter taking an arithmetic average of the numbers of particles of spheroidal cementite at the three locations.

In the case of a rolled round steel material for a steering rack bar of the present invention, when in a cross-section perpendicular to the rolling direction, the area fraction of lamellar pearlite in a central part is less than 20%, toughness will increase, thereby causing deterioration of chip treatability. Therefore, the area fraction of lamellar pearlite is specified to be not less than 20%. The area fraction of lamellar pearlite is preferably not less than 25%, and is also preferably not more than 80%.

The area fraction of lamellar pearlite may be determined by, for example, respectively determining area fractions of lamellar pearlite at two locations including a position at ¾ radius from the surface of the rolled round steel material (hereafter, referred to as "3R/4 position"), and a center position, and thereafter taking an arithmetic average of the area fractions of lamellar pearlite at the two locations.

In the case of a rolled round steel material for a steering rack bar of the present invention, when in a cross-section perpendicular to the rolling direction, the number of particles of spheroidal cementite in a central part is not less than $4 \times 10^5/\text{mm}^2$, toughness will increase, thereby causing deterioration of chip treatability. Therefore, the number of particles of spheroidal cementite in a central part is specified to be less than $4 \times 10^5/\text{mm}^2$ Although the number of particles of spheroidal cementite may be $0/\text{mm}^2$, it is preferably not less than $1 \times 10^2/\text{mm}^2$, and is also preferably not more than $3 \times 10^5/\text{mm}^2$.

The number of particles of spheroidal cementite may be determined by, for example, respectively determining numbers of particles of spheroidal cementite at two locations including a 3R/4 position and a center position of the rolled round steel material, and thereafter taking an arithmetic average of the numbers of particles of spheroidal cementite at the two locations.

In the case of a rolled round steel material for a steering rack bar of the present invention, when in a cross-section including a center line of the round steel material and parallel to the rolling direction, an average aspect ratio of the ferrite grains in the region from the surface to the position at ½ radius is less than 3, a crack becomes likely to propagate in a cross-section perpendicular to the rolling direction, thereby causing deterioration of toughness. Therefore, the average aspect ratio of ferrite grains is specified to be not less than 3. The average aspect ratio of ferrite grains is preferably not less than 4, and is also preferably not more than 45.

The average aspect ratio of ferrite grains may be determined by, for example, respectively determining average aspect ratios of ferrite grains at three locations including a position at 1 mm from the surface of the rolled round steel material, an R/4 position, and an R/2 position, and thereafter taking an arithmetic average of the average aspect ratios at the three locations.

The above described microstructure of a rolled round steel material for a steering rack bar of the present invention can be obtained by, for example, hot rolling and cooling a workpiece having an already described chemical composition in a manner as described below.

As the hot rolling method, a fully continuous hot rolling method with two or more rolling steps is suitable for producing a rolled round steel material for a steering rack bar of the present invention. Therefore, the following description will be made based on rolling by the fully continuous hot rolling method (hereafter, simply referred to as "fully continuous hot rolling").

A workpiece having an already described chemical composition is heated to a temperature range of 670 to 850° C., and thereafter the fully continuous hot rolling is started.

When the heating temperature is higher than 850° C., it becomes likely that strain is released so that in a cross-section perpendicular to the rolling direction, one or more of the average ferrite grain diameter, the area fraction of lamellar pearlite, and the number of particles of spheroidal cementite in a region from a surface to a position at ½ radius may deviate from the conditions described in the cross-section of "2. Microstructure". Moreover, when the heating temperature is less than 670° C., in the above described cross-section, one or more of the area fraction of lamellar pearlite and the number of particles of spheroidal cementite in a central part may deviate from the above described microstructure conditions.

Note that in the heating in the temperature range of 670 to 850° C., heating treatment for long hours may be performed not only to increase the temperature of the workpiece (starting material) to a predetermined range, but also to uniformize the temperature distribution in the cross-section of the starting material. In such a case, ferrite decarburization may occur on the surface of the starting material. Therefore, to suppress the ferrite decarburization, heating time in the above described temperature range is preferably not more than 3 hours.

The fully continuous hot rolling is preferably performed in such a way to satisfy the following conditions [1] and [2].

[1] The surface temperature of the workpiece is 500 to 810° C., a cumulative reduction of area in a temperature range of 650 to 810° C. is not less than 30%, and further the cumulative reduction of area in a temperature range of not less than 500° C. to less than 650° C. is not less than 35%. However, the "surface temperature of the workpiece" does not include the surface temperature of the workpiece during the intermediate cooling step to be described below.

[2] Supposing that "v(m/s)" be a velocity of workpiece at the end of the fully continuous hot rolling, that is, an exit side of the final rolling mill (hereafter, referred to as "finishing velocity"), "Rd (%)" be a total reduction of area of the fully continuous hot rolling, and "T(° C.)" be the heating temperature of the workpiece, the following Formula fn(1) satisfies the condition of not less than 0:

$$fn(1) = v \cdot Rd/100 - (1000 - T)/100$$

where, the reduction of area (%) when the workpiece having a cross sectional area A is rolled to a cross sectional area A' is determined by the formula of $\{(A-A')/A\} \times 100$. Moreover, "total reduction of area" refers to a value (%) to be determined by a formula of $\{(A_0-A_f)/A_0\} \times 100$ when supposed that the cross sectional area before rolling of the workpiece in the fully continuous hot rolling be $A_0$, and the cross sectional area after exit of the final rolling mill be $A_f$.

Regarding [1], when the temperature of the workpiece is more than 810° C. during rolling, it becomes likely that strain is released so that in a cross-section perpendicular to the rolling direction, one or more of the average ferrite grain diameter, the area fraction of lamellar pearlite, and the number of particles of spheroidal cementite in a region from a surface to a position at ½ radius may deviate from the conditions described in the cross-section of "2. Microstructure". Moreover, when the above described temperature is less than 500° C., the load on the mill significantly increases, and cracking is likely to occur during rolling. Therefore, the surface temperature of the workpiece is preferably 500 to 810° C. during rolling.

Further, when the cumulative reduction of area in a temperature range of 650 to 810° C. becomes less than 30%, in a cross-section perpendicular to the rolling direction, one or more of the average ferrite grain diameter, the area fraction of lamellar pearlite, and the number of particles of spheroidal cementite in a region from a surface to a position at ½ radius may deviate from the microstructure conditions described above. The upper limit of the cumulative reduction of area in the range of 650 to 810° C. will be about 99.5% to prevent a large scale extension of production line.

Moreover, when the cumulative reduction of area in a temperature range of not less than 500° C. to less than 650° C. becomes less than 35%, one or more of the average aspect ratio of ferrite grains in a region from a surface to a position at ½ radius in a cross-section including the center line of the workpiece and parallel to the rolling direction, and the number of particles of spheroidal cementite in a region from a surface to a position at ½ radius in a cross-section perpendicular to the rolling direction may deviate from the microstructure conditions described above. The upper limit of the cumulative reduction of area in the range of not less than 500° C. to less than 650° C. will be about 80% to prevent a large scale extension of production line.

[2] is an empirically obtained formula to make the microstructure of a central part in a cross-section perpendicular to the rolling direction be one described in the cross-section of "2, Microstructure". When fn(1) becomes less than 0, in a cross-section perpendicular to the rolling direction, one or more of the area fraction of lamellar pearlite and the number of particles of spheroidal cementite in a central part may deviate from the microstructure conditions described above.

When rolling a rolled round steel material for a rack bar in the present invention, intermediate cooling such as water cooling may be performed in a midway step. Note that in the intermediate cooling step, the surface temperature of the workpiece may temporarily become less than 500° C. However, even if the surface temperature of the workpiece becomes less than 500° C. due to the cooling, the effect of the temporal decrease of the surface temperature of the workpiece to less than 500° C. by cooling may be neglected if the following rolling step is started after the temperature is recuperated to a temperature not less than 500° C. by sensible heat within the workpiece. Moreover, if untransformed austenite in the workpiece has transformed into a hard phase such as martensite and bainite, the microstructure defined in the present invention may not be obtained. To prevent this, cooling in the intermediate cooling step is preferably performed in such a manner that a time period Δt until the surface temperature of the workpiece recuperates to a temperature of not less than 500° C. after it temporarily becomes less than 500° C. is not more than 10 seconds. Further, for aiming at production by a more stable fully continuous hot rolling, an intermediate cooling step in which Δt is not more than 8 seconds is preferable.

After being processed into a predetermined shape by being subjected to the fully continuous hot rolling as described above, the workpiece is preferably subjected to final cooling at a condition in which the cooling rate of the surface is 0.5 to 200° C./s in a temperature range to 500° C.

When the cooling rate of the surface is less than 0.5° C./s after the end of fully continuous hot rolling, in a cross-section perpendicular to the rolling direction, one or more of the area fraction of lamellar pearlite and the number of particles of spheroidal cementite of a central part may deviate from the conditions described in the cross-section of "2. Microstructure". On the other hand, when the cooling rate of the surface exceeds 200° C./s, untransformed austenite may transform into a hard phase such as martensite and bainite.

Hereafter, the present invention will be described in more detail by means of examples.

EXAMPLE

Example 1

Square billets (160 mm square and 10 m length) made of Steels A to W having chemical compositions shown in Table 1 were prepared.

TABLE 1

| Steel | Chemical composition (mass %) Balance: Fe and impurities | | | | | | | | | | | | | | | |
|---|---|---|---|---|---|---|---|---|---|---|---|---|---|---|---|---|
| | C | Si | Mn | P | S | Cr | Al | N | Cu | Ni | Mo | Ti | Nb | V | Ca | Pb |
| A | 0.42 | 0.65 | 0.45 | 0.009 | 0.030 | 1.23 | 0.028 | 0.006 | — | — | — | — | — | — | — | — |
| B | 0.45 | 0.80 | 0.75 | 0.010 | 0.050 | 0.09 | 0.042 | 0.013 | — | — | — | — | — | — | — | — |
| C | 0.48 | 0.11 | 1.45 | 0.007 | 0.073 | 0.99 | 0.019 | 0.008 | — | — | — | — | — | — | — | — |
| D | 0.43 | 0.41 | 0.43 | 0.013 | 0.015 | 1.60 | 0.050 | 0.004 | — | — | — | — | — | — | — | — |
| E | 0.45 | 0.21 | 0.74 | 0.014 | 0.029 | 0.11 | 0.038 | 0.007 | — | — | — | — | — | — | — | — |
| F | 0.54 | 0.53 | 0.62 | 0.018 | 0.046 | 0.15 | 0.025 | 0.008 | — | — | — | — | — | — | — | — |
| G | 0.40 | 0.12 | 1.20 | 0.006 | 0.063 | 0.63 | 0.036 | 0.005 | — | — | — | — | — | — | — | — |
| H | 0.53 | 0.22 | 0.58 | 0.011 | 0.029 | 0.44 | 0.021 | 0.007 | 0.15 | — | — | — | — | — | — | — |
| I | 0.44 | 0.34 | 0.77 | 0.007 | 0.008 | 0.10 | 0.028 | 0.006 | — | 0.13 | — | — | — | — | — | — |
| J | 0.39 | 0.13 | 0.81 | 0.009 | 0.059 | 0.52 | 0.030 | 0.015 | — | — | 0.08 | — | — | — | — | — |
| K | 0.45 | 0.27 | 0.93 | 0.005 | 0.025 | 0.05 | 0.040 | 0.018 | — | — | 0.10 | 0.010 | — | — | — | — |
| L | 0.49 | 0.43 | 0.65 | 0.007 | 0.038 | 0.07 | 0.072 | 0.005 | — | — | — | — | 0.020 | — | — | — |
| M | 0.47 | 0.63 | 1.21 | 0.008 | 0.042 | 0.22 | 0.034 | 0.010 | — | — | — | — | — | 0.098 | — | — |
| N | 0.46 | 0.34 | 0.87 | 0.005 | 0.025 | 0.12 | 0.063 | 0.011 | — | — | — | — | — | — | 0.002 | — |
| O | 0.41 | 0.72 | 1.02 | 0.003 | 0.020 | 1.01 | 0.018 | 0.013 | — | 0.21 | — | — | — | — | — | 0.13 |
| P | 0.48 | 0.27 | 0.74 | 0.003 | 0.033 | 0.12 | 0.031 | 0.007 | — | — | — | — | 0.019 | — | 0.002 | — |
| Q | 0.51 | 0.38 | 0.41 | 0.023 | 0.077 | 0.33 | 0.022 | 0.009 | 0.23 | — | — | — | 0.021 | — | 0.003 | — |
| R | *0.58 | 0.22 | 0.66 | 0.006 | 0.053 | 0.99 | 0.022 | 0.006 | — | — | — | — | — | — | — | — |
| S | 0.44 | *1.21 | 0.75 | 0.011 | 0.027 | 0.92 | 0.019 | 0.003 | — | 0.08 | — | — | — | — | — | — |
| T | 0.45 | 0.55 | *2.20 | 0.007 | 0.033 | 1.03 | 0.028 | 0.006 | — | — | — | — | — | 0.033 | — | — |
| U | 0.40 | 0.20 | 0.55 | *0.052 | 0.070 | 0.12 | 0.044 | 0.005 | — | — | — | — | — | — | — | 0.15 |
| V | 0.38 | 0.41 | 0.74 | 0.008 | *0.003 | 0.06 | 0.037 | 0.010 | — | — | — | — | — | — | — | — |
| W | 0.53 | 0.43 | 0.81 | 0.013 | 0.022 | *2.18 | 0.034 | 0.012 | — | — | — | — | — | — | — | — |

*indicates deviation from the chemical composition condition defined in the present invention.

Each of the square billets was rolled into a steel bar having a diameter of 34 mm at conditions shown as Test Nos. 1 to 31 in Table 2 by a fully continuous hot rolling line with a cooling facility. To be specific, after being processed into a diameter of 60 mm by a rough rolling mill train, and further into a diameter of 50 mm by an intermediate rolling mill train, each square billet was processed into a steel bar having a diameter of 34 mm by a finish rolling mill train, thus performing hot rolling of which "total reduction of area: Rd" is 96.4%.

The cumulative reduction of area when a square billet of 160 mm square was processed into a diameter of 50 mm by a rough rolling mill train and an intermediate rolling mill train was 92.3%. Moreover, the cumulative reduction of area when the workpiece that exited the rough rolling mill train and had a diameter of 60 mm was processed into a steel bar having a diameter of 34 mm by an intermediate rolling mill train and a finish rolling mill train was 67.9%. The cumulative reduction of area when a square billet of 160 mm square was processed into a steel bar having a diameter of 34 mm by a rough rolling mill train, an intermediate rolling mill train, and a finish rolling mill train, that is, the total reduction of area was 96.4%.

Rough rolling mill train: consisting of 8 rolling mills,
Intermediate rolling mill train: consisting of 4 rolling mills,
Finish rolling mill train: consisting of 4 rolling mills, and
Cooling zone: installed between the 8th rolling mill of the rough rolling mill train and the first rolling mill of the intermediate rolling mill train, and between the 4th rolling mill of the intermediate rolling mill train and the first rolling mill of the finish rolling mill train.

Note that the surface temperature of the workpiece during rolling and the surface temperature of the workpiece during the cooling procedure after the end of continuous rolling were measured by using a radiation thermometer, and a time period Δt' from the end of the cooling step in midway to the start of the following rolling step was measured.

After the end of continuous rolling, that is, after rolling by the 4th rolling mill of the finish rolling mill train ended, the workpiece was finally cooled to 500° C. while controlling a cooling rate such as by natural (air) cooling or wind cooling in the atmosphere. Note that cooling thereafter was conducted by cooling in the atmosphere.

In Table 2, the rough rolling mill train, intermediate rolling mill train, and finish rolling mill train are denoted by "Rough train", "Intermediate train", and "Finish train", respectively.

Note that "Entering temperature" and "Exiting temperature" in each column of the Rough train, Intermediate train, and Finish train respectively indicate surface temperatures of the workpiece measured by means of a radiation thermometer at time points immediately before the workpiece entered the rough train, the intermediate train, and the finish train, and immediately after it exited therefrom, and the cooling rate to 500° C. after rolling was determined from the surface temperature of the workpiece measured by means of a radiation thermometer and the cooling time to 500° C.

Note that for Test Nos, 1 to 31, the time period Δt' from the end of the cooling step in midway to the start of the following rolling step was not more than 8 seconds in any case.

TABLE 2

| | | Heating | Rough train | | | Intermediate train | | | Finish train | | |
|---|---|---|---|---|---|---|---|---|---|---|---|
| Test No. | Steel | temperature [T] (° C.) | Entering temperature (° C.) | Exiting temperature (° C.) | Reduction of area (%) | Entering temperature (° C.) | Exiting temperature (° C.) | Reduction of area (%) | Entering temperature (° C.) | Exiting temperature (° C.) | Reduction of area (%) |
| 1 | A | 805 | 765 | 745 | 89.0 | 655 | 680 | 30.6 | 580 | 635 | 53.8 |
| 2 | B | 815 | 770 | 780 | 89.0 | 655 | 670 | 30.6 | 600 | 635 | 53.8 |
| 3 | C | 795 | 765 | 755 | 89.0 | 660 | 675 | 30.6 | 590 | 640 | 53.8 |

TABLE 2-continued

| | | | | | | | | | | |
|---|---|---|---|---|---|---|---|---|---|---|
| 4 | D | 800 | 755 | 760 | 89.0 | 620 | 645 | 30.6 | 590 | 620 | 53.8 |
| 5 | E | 790 | 750 | 760 | 89.0 | 650 | 670 | 30.6 | 585 | 640 | 53.8 |
| 6 | F | 820 | 775 | 770 | 89.0 | 650 | 675 | 30.6 | 600 | 645 | 53.8 |
| 7 | G | 805 | 760 | 780 | 89.0 | 630 | 645 | 30.6 | 595 | 635 | 53.8 |
| 8 | H | 785 | 740 | 745 | 89.0 | 630 | 645 | 30.6 | 600 | 640 | 53.8 |
| 9 | I | 810 | 770 | 780 | 89.0 | 665 | 680 | 30.6 | 590 | 635 | 53.8 |
| 10 | J | 810 | 765 | 765 | 89.0 | 650 | 665 | 30.6 | 545 | 585 | 53.8 |
| 11 | K | 790 | 750 | 780 | 89.0 | 625 | 645 | 30.6 | 590 | 625 | 53.8 |
| 12 | L | 700 | 665 | 680 | 89.0 | 655 | 685 | 30.6 | 615 | 645 | 53.8 |
| 13 | M | 800 | 760 | 770 | 89.0 | 655 | 670 | 30.6 | 580 | 625 | 53.8 |
| 14 | N | 800 | 755 | 760 | 89.0 | 625 | 645 | 30.6 | 595 | 630 | 53.8 |
| 15 | O | 810 | 765 | 770 | 89.0 | 625 | 640 | 30.6 | 580 | 625 | 53.8 |
| 16 | P | 805 | 750 | 765 | 89.0 | 660 | 685 | 30.6 | 600 | 635 | 53.8 |
| 17 | Q | 790 | 740 | 755 | 89.0 | 630 | 645 | 30.6 | 590 | 630 | 53.8 |
| 18 | *R | 790 | 750 | 745 | 89.0 | 625 | 640 | 30.6 | 600 | 625 | 53.8 |
| 19 | *S | 810 | 760 | 770 | 89.0 | 660 | 685 | 30.6 | 605 | 640 | 53.8 |
| 20 | *T | 805 | 770 | 765 | 89.0 | 650 | 670 | 30.6 | 540 | 575 | 53.8 |
| 21 | *U | 770 | 740 | 740 | 89.0 | 710 | 730 | 30.6 | 600 | 640 | 53.8 |
| 22 | *V | 790 | 750 | 755 | 89.0 | 620 | 645 | 30.6 | 580 | 620 | 53.8 |
| 23 | *W | 810 | 770 | 780 | 89.0 | 705 | 725 | 30.6 | 600 | 635 | 53.8 |
| 24 | E | 870 | 830 | 850 | 89.0 | 715 | 740 | 30.6 | 620 | 645 | 53.8 |
| 25 | E | 840 | 815 | 830 | 89.0 | 815 | 840 | 30.6 | 760 | 780 | 53.8 |
| 26 | E | 680 | 630 | 640 | 89.0 | 600 | 640 | 30.6 | 580 | 630 | 53.8 |
| 27 | E | 840 | 780 | 800 | 89.0 | 700 | 730 | 30.6 | 660 | 690 | 53.8 |
| 28 | E | 800 | 760 | 770 | 89.0 | 600 | 620 | 30.6 | 600 | 615 | 53.8 |
| 29 | J | 900 | 870 | 890 | 89.0 | 760 | 810 | 30.6 | 690 | 720 | 53.8 |
| 30 | M | 690 | 630 | 645 | 89.0 | 590 | 610 | 30.6 | 550 | 585 | 53.8 |
| 31 | P | 710 | 660 | 680 | 89.0 | 610 | 645 | 30.6 | 655 | 700 | 53.8 |

| Test No. | Cumulative reduction of area in 650 to 810° C. (%) | Cumulative reduction of area in not less than 500° C. to less than 650° C. (%) | Total reduction of area [Rd] (%) | Finishing speed [v] (m/s) | fn (1) | Cooling rate to 500° C. (° C./s) |
|---|---|---|---|---|---|---|
| 1 | 92.3 | 53.8 | 96.4 | 3.1 | 1.0 | 20 |
| 2 | 92.3 | 53.8 | 96.4 | 3.3 | 1.3 | 25 |
| 3 | 92.3 | 53.8 | 96.4 | 2.9 | 0.7 | 25 |
| 4 | 89.0 | 67.9 | 96.4 | 3.0 | 0.9 | 30 |
| 5 | 92.3 | 53.8 | 96.4 | 2.8 | 0.6 | 25 |
| 6 | 92.3 | 53.8 | 96.4 | 3.2 | 1.3 | 20 |
| 7 | 89.0 | 67.9 | 96.4 | 3.3 | 1.2 | 20 |
| 8 | 89.0 | 67.9 | 96.4 | 3.1 | 0.8 | 25 |
| 9 | 92.3 | 53.8 | 96.4 | 3.0 | 1.0 | 25 |
| 10 | 92.3 | 53.8 | 96.4 | 2.9 | 0.9 | 25 |
| 11 | 89.0 | 67.9 | 96.4 | 2.9 | 0.7 | 30 |
| 12 | 92.3 | 53.8 | 96.4 | 3.2 | 0.1 | 35 |
| 13 | 92.3 | 53.8 | 96.4 | 3.1 | 1.0 | 25 |
| 14 | 89.0 | 67.9 | 96.4 | 3.0 | 0.9 | 20 |
| 15 | 89.0 | 67.9 | 96.4 | 3.0 | 1.0 | 20 |
| 16 | 92.3 | 53.8 | 96.4 | 2.6 | 0.6 | 25 |
| 17 | 89.0 | 67.9 | 96.4 | 3.2 | 1.0 | 30 |
| 18 | 89.0 | 67.9 | 96.4 | 3.0 | 0.8 | 25 |
| 19 | 92.3 | 53.8 | 96.4 | 2.8 | 0.8 | 35 |
| 20 | 92.3 | 53.8 | 96.4 | 3.1 | 1.0 | 20 |
| 21 | 92.3 | 53.8 | 96.4 | 3.5 | 1.1 | 25 |
| 22 | 89.0 | 67.9 | 96.4 | 2.5 | 0.3 | 25 |
| 23 | 92.3 | 53.8 | 96.4 | 3.2 | 1.2 | 30 |
| 24 | 30.6 | 53.8 | 96.4 | 2.6 | 1.7 | 35 |
| 25 | 53.8 | 0.0 | 96.4 | 7.9 | 6.0 | 30 |
| 26 | 0.0 | 96.4 | 96.4 | 1.4 | −1.9 | 20 |
| 27 | 96.4 | 0.0 | 96.4 | 6.3 | 4.5 | 25 |
| 28 | 89.0 | 67.9 | 96.4 | 0.8 | −1.2 | 20 |
| 29 | 67.9 | 0.0 | 96.4 | 4.0 | 2.9 | 30 |
| 30 | 0.0 | 96.4 | 96.4 | 2.2 | −1.0 | 35 |
| 31 | 93.1 | 30.6 | 96.4 | 10.0 | 6.7 | 35 | fn (1) = v · Rd/100 − (1000 − T)/100
*Indicates a Steel which is deviated from chemical composition defined in the present invention.

For each of the steel bars thus obtained, the microstructure, tensile characteristic, impact characteristic, and machinability were investigated in the following methods.

A specimen having a length of 20 mm was cut out from each steel bar having a diameter of 34 mm, and was embedded in resin to be mirror polished such that a cross-section of the specimen perpendicular to the rolling direction and a cross-section including the center line and parallel to the rolling direction became test surfaces.

The cross-section perpendicular to the rolling direction was first subjected to etching by 3% nitric acid alcohol (Nital) to make the microstructure appear and was observed with a scanning type electronic microscope (hereafter, referred to as "SEM") to perform phase identification and investigate the average grain diameter of ferrite and the area fraction of lamellar pearlite.

To be specific, for the microstructure in a region from a surface to a position at ½ radius, metal structure of 3 locations including a position at 1 mm from the surface, a position at 4.25 mm from the surface (R/4 position), and a position at 8.5 mm from the surface (R/2 position) was observed by SEM at a magnification of 2000 times in 4 fields of view at an interval of 90° in the circumferential direction for each location, which amounts to a total of 12 fields of view, to identify the phases that constituted the microstructure, and determine the average grain diameter of ferrite and the area fraction of lamellar pearlite with image analysis software by using picked up images thereof. Similarly, for the microstructure in a central part, metal structure of 2 locations including a position at 12.75 mm from the surface (3R/4 position), and a center position was observed by SEM at a magnification of 2000 times in 4 fields of view at an interval of 90° in the circumferential direction for the 3R/4 position and one field of view for the center position, which amounts to a total of 5 fields of view, to identify the phases that constituted the microstructure, and determine the average grain diameter of ferrite and the area fraction of lamellar pearlite with image analysis software by using picked up images thereof.

Next, the specimen which had been etched by Nital was mirror polished again, and was thereafter etched by picric acid alcohol (Picral) and observed with SEM to investigate the number of particles of spheroidal cementite per area of 1 mm$^2$ for each of a region from a surface to a position at ½ radius and a central part. That is, for the region from the surface to a position at ½ radius, metal structure of 3 locations including a position at 1 mm from the surface, an R/4 position, and an R/2 position was observed with SEM at a magnification of 5000 times in 4 fields of view at an interval of 90° in the circumferential direction for each location, which amounts to a total of 12 fields of view; and using the picked up images, the major diameter L and the minor diameter W of each cementite particle were measured individually by means of image analysis software to count the number of particles of cementite in which L/W was not more than 2.0, that is, spheroidal cementite, and finally calculate the number of particles (1/mm$^2$) of spheroidal cementite per area of 1 mm$^2$ Similarly, on the central part, metal structure observation was made at in 2 locations including the 3R/4 position and the center position with SEM at a magnification of 5000 times in 4 fields of view at an interval of 90° in the circumferential direction for the 3R/4 position, and 1 field of view for the center position, which amounts to a total of 5 fields of view; and using the picked up images, the number of particles of spheroidal cementite per area of 1 mm$^2$ was calculated with image analysis software.

On the other hand, for a cross-section including the center line and parallel to the rolling direction, electropolishing was further performed after mirror polishing, and observation was made with an electron beam backscatter pattern method (hereafter referred to as "EBSD").

To be specific, for the microstructure of a region from a surface to a position at ½ radius, metal structure of 3 locations including a position at 1 mm from the surface, an R/4 position and an R/2 position was observed with EBSD, and an average aspect ratio of ferrite grains was determined by measuring the orientation of ferrite and performing image analysis supposing that orientation difference of not less than 15° indicate a grain boundary.

Regarding tensile characteristic, a No. 14A specimen (in which, diameter of parallel part: 4 mm) defined in JIS Z 2241 (2011) was taken such that the R/4 position of each steel bar having a diameter of 34 mm coincided with the center axis of the specimen, and a tensile test was conducted at room temperature with the gage length being 20 mm to determine tensile strength (MPa).

Regarding impact characteristic, a V-notch Charily impact test specimen already described was taken such that the notch was oriented toward the surface as schematically shown in FIG. 1 and the R/4 position of each steel bar having a diameter of 34 mm exactly corresponded to the notch bottom position, and a Charpy impact test was conducted at 25° C. to determine impact values (J/cm$^2$).

Regarding machinability, after each steel bar having a diameter of 34 mm was cut into a length of 170 mm, cutting resistance was evaluated by measuring torque when a deep hole machining was performed up to a depth of 150 mm in the rolling direction with reference to the center of the cross-section perpendicular to the rolling direction at the following conditions by using a gun drill having a diameter of 8.0 mm.

Revolution speed: 2300 rpm
Feed: 0.05 mm/rev, and
Oil supplying pressure: 5 MPa.

Note that the target of base metal toughness was set as that the impact value be not less than 120 J/cm$^2$. Moreover, the target of machinability was set as that the above described torque be not more than 300 N·cm.

Table 3 shows the results of each investigation described above. Note that "◯" mark in the "Evaluation" column of Table 3 indicates that the targets of impact characteristic and machinability were both satisfied, and on the other hand, "×" mark indicates that at least one of the targets was not achieved.

TABLE 3

| | | | Microstructure in a region extending from the surface to R/2 position | | | | |
|---|---|---|---|---|---|---|---|
| | | | Transverse section | | | Vertical section | Microstructure |
| Test No. | Steel | Phase | Average grain diameter of F (μm) | Area fraction of LP (%) | Number of particles of SC (/mm$^2$) | Average aspect ratio of F | of central part Phase |
| 1 | A | F + LP + C | 5.3 | 8.2 | 9.5 × 10$^5$ | 4.0 | F + LP + C |
| 2 | B | F + LP + C | 7.2 | 12.3 | 8.0 × 10$^5$ | 4.4 | F + LP + C |
| 3 | C | F + LP + C | 3.3 | 5.6 | 8.0 × 10$^5$ | 4.5 | F + LP + C |
| 4 | D | F + LP + C | 3.7 | 6.6 | 8.5 × 10$^5$ | 4.8 | F + LP + C |
| 5 | E | F + LP + C | 4.1 | 8.1 | 7.5 × 10$^5$ | 4.0 | F + LP + C |
| 6 | F | F + LP + C | 3.9 | 5.9 | 8.0 × 10$^5$ | 4.2 | F + LP + C |
| 7 | G | F + LP + C | 2.9 | 5.3 | 9.0 × 10$^5$ | 4.5 | F + LP + C |
| 8 | H | F + LP + C | 7.9 | 10.4 | 6.5 × 10$^5$ | 5.5 | F + LP + C |
| 9 | I | F + LP + C | 6.4 | 7.7 | 7.5 × 10$^5$ | 4.1 | F + LP + C |

TABLE 3-continued

| Test No. | Steel | Microstructure | | | | | Microstructure |
|---|---|---|---|---|---|---|---|
| 10 | J | F + LP + C | 3.6 | 7.5 | 9.5 × 10⁵ | 4.5 | F + LP + C |
| 11 | K | F + LP + C | 2.8 | 4.4 | 1.0 × 10⁶ | 4.5 | F + LP + C |
| 12 | L | F + LP + C | 1.9 | 5.3 | 1.0 × 10⁶ | 5.0 | F + LP + C |
| 13 | M | F + LP + C | 2.2 | 4.2 | 9.0 × 10⁵ | 5.0 | F + LP + C |
| 14 | N | F + LP + C | 4.2 | 5.1 | 7.5 × 10⁵ | 4.7 | F + LP + C |
| 15 | O | F + LP + C | 7.3 | 5.1 | 8.0 × 10⁵ | 5.1 | F + LP + C |
| 16 | P | F + LP + C | 3.4 | 4.2 | 8.0 × 10⁵ | 5.2 | F + LP + C |
| 17 | Q | F + LP + C | 3.3 | 4.0 | 9.5 × 10⁵ | 4.3 | F + LP + C |
| 18 | *R | F + LP + C | 5.1 | 6.2 | 8.0 × 10⁵ | 4.1 | F + LP + C |
| 19 | *S | F + LP + C | 2.1 | 5.1 | 1.0 × 10⁶ | 4.8 | F + LP + C |
| 20 | *T | F + LP + C | 2.4 | 3.3 | 8.5 × 10⁵ | 5.0 | F + LP + C |
| 21 | *U | F + LP + C | 1.9 | 3.1 | 9.0 × 10⁵ | 5.0 | F + LP + C |
| 22 | *V | F + LP + C | 2.2 | 4.3 | 8.0 × 10⁵ | 4.5 | F + LP + C |
| 23 | *W | F + LP + C | 3.3 | 4.8 | 8.0 × 10⁵ | 4.0 | F + LP + C |
| 24 | E | F + LP + C | *13.3 | 15.3 | 6.5 × 10⁵ | 4.3 | F + LP + C |
| 25 | E | F + LP + C | *11.5 | *35.5 | *3.0 × 10⁵ | *2.3 | F + LP + C |
| 26 | E | F + LP + C | *10.3 | 7.4 | 5.5 × 10⁵ | 5.1 | F + LP + C |
| 27 | E | F + LP + C | 7.5 | 9.9 | 7.0 × 10⁵ | *1.5 | F + LP + C |
| 28 | E | F + LP + C | 6.2 | 10.2 | 6.5 × 10⁵ | 4.0 | F + LP + C |
| 29 | J | F + LP + C | *17.9 | *40.3 | *5.0 × 10⁴ | *1.5 | F + LP + C |
| 30 | M | F + LP + C | *11.2 | 3.2 | 8.5 × 10⁵ | 6.6 | F + LP + C |
| 31 | P | F + LP + C | 5.4 | 8.7 | 5.0 × 10⁵ | *1.4 | F + LP + C |

| | Microstructure of central part Transverse section | | Mechanical properties | | Machinability | |
|---|---|---|---|---|---|---|
| Test No. | Area fraction of LP (%) | Number of particles of SC (/mm²) | Tensile strength (MPa) | V-notch Charpy impact value (J/cm²) | Torque when performing deep hole machining with gun drill (N · cm) | Evaluation |
| 1 | 34.3 | 1.0 × 10⁵ | 780 | 200 | 270 | ○ |
| 2 | 40.1 | 5.0 × 10⁴ | 770 | 205 | 255 | ○ |
| 3 | 27.5 | 5.0 × 10⁴ | 820 | 175 | 245 | ○ |
| 4 | 31.2 | 3.0 × 10⁴ | 790 | 235 | 265 | ○ |
| 5 | 42.6 | 4.0 × 10⁴ | 800 | 210 | 255 | ○ |
| 6 | 28.2 | 1.0 × 10⁴ | 840 | 130 | 280 | ○ |
| 7 | 34.3 | 1.0 × 10⁵ | 740 | 225 | 240 | ○ |
| 8 | 48.2 | 1.0 × 10⁴ | 845 | 145 | 285 | ○ |
| 9 | 37.9 | 1.0 × 10⁵ | 770 | 210 | 280 | ○ |
| 10 | 34.3 | 5.0 × 10⁴ | 760 | 225 | 245 | ○ |
| 11 | 42.9 | 7.0 × 10⁴ | 840 | 145 | 265 | ○ |
| 12 | 33.3 | 1.0 × 10⁵ | 840 | 180 | 270 | ○ |
| 13 | 36.7 | 1.0 × 10⁴ | 850 | 175 | 270 | ○ |
| 14 | 38.3 | 1.0 × 10⁴ | 780 | 230 | 245 | ○ |
| 15 | 34.4 | 8.0 × 10⁴ | 820 | 155 | 285 | ○ |
| 16 | 48.3 | 5.0 × 10⁴ | 790 | 210 | 230 | ○ |
| 17 | 32.6 | 1.0 × 10⁴ | 835 | 150 | 290 | ○ |
| 18 | 51.5 | 1.5 × 10⁵ | 800 | #100 | 290 | X |
| 19 | 57.3 | 1.5 × 10⁵ | 820 | 180 | #360 | X |
| 20 | 37.3 | 1.5 × 10⁵ | 830 | 195 | #355 | X |
| 21 | 31.3 | 2.0 × 10⁵ | 700 | #95 | 240 | X |
| 22 | 29.2 | 5.0 × 10⁴ | 830 | #110 | #420 | X |
| 23 | 34.9 | 1.0 × 10⁵ | 795 | 210 | #450 | X |
| 24 | 44.0 | 3.0 × 10⁴ | 720 | #110 | 250 | X |
| 25 | 50.6 | 2.0 × 10⁴ | 740 | #90 | 255 | X |
| 26 | *12.3 | *7.5 × 10⁵ | 780 | #105 | #450 | X |
| 27 | 30.0 | 5.0 × 10⁴ | 760 | #110 | 265 | X |
| 28 | *11.5 | *4.5 × 10⁵ | 800 | 225 | #325 | X |
| 29 | 49.2 | 1.0 × 10⁴ | 800 | #75 | 245 | X |
| 30 | *5.3 | *7.5 × 10⁵ | 815 | #100 | #490 | X |
| 31 | 43.1 | 5.0 × 10⁴ | 760 | #105 | 225 | X |

In Microstructure columns, "transverse section" refers to a cross-section perpendicular to rolling direction, and "vertical section" refers to a cross-section including the center line and parallel to the rolling direction. Also "F" indicates ferrite, "LP" lamellar pearlite, "C" cementite, and "SC" spheroidal cementite.
"Central part" refers to an area located within a distance up to ¼ radius from the center.
*mark indicates deviation from the conditions defined in the present invention.
mark indicates that its target is unreached.

Table 3 reveals that in the case of steel bars of Test Nos. 1 to 17 which satisfied the conditions of chemical composition and microstructure defined in the present invention, their evaluations were "○" indicating that they achieved targeted characteristics (excellent base metal toughness of an impact value of not less than 120 J/cm2 at a test temperature of 25° C. in a Charpy impact test using a V-notch Charpy impact test specimen, and excellent machinability of a torque of not more than 300 N·cm when performing deep hole machining with a gun drill) without being subjected to thermal refining treatment.

In contrast to this, in the case of steel bars of Test Nos. 18 to 31 which deviated from at least one of the conditions of the chemical composition and the microstructure defined in the present invention, evaluations were "x" clearly indicating that the targeted characteristics were not achieved, and omission of thermal refining treatment was not possible.

That is, in the case of Test No. 18, C content of Steel R used was as high as 0.58%, exceeding the value defined in the present invention. For this reason, the V-notch Charpy impact value was as low as 100 J/cm$^2$.

In the case of Test No. 19, Si content of Steel S used was as high as 1.21%, exceeding the value defined in the present invention. For this reason, the torque when performing deep hole machining with a gun drill was as high as 360 N·cm.

In the case of Test No. 20, Mn content of Steel T used was as high as 2.20%, exceeding the value defined in the present invention. For this reason, the torque when performing deep hole machining with a gun drill was as high as 355 N·cm.

In the case of Test No. 21, P content of Steel U used was as high as 0.052%, exceeding the value defined in the present invention. For this reason, the V-notch Charpy impact value was as low as 95 J/cm$^2$.

In the case of Test No. 22, S content of Steel V used was as low as 0.003%, falling below the value defined in the present invention. For this reason, the V-notch Charpy impact value was as low as 110 J/cm$^2$, and the torque when deep hole machining was performed with a gun drill was as high as 420 N·cm.

In the case of Test No. 23, Cr content of Steel W used was as high as 2.18%, exceeding the value defined in the present invention. For this reason, the torque when performing deep hole machining with a gun drill was as high as 450 N·cm.

In the cases of Test Nos. 24 to 28, although the chemical composition of Steel E used satisfied the conditions defined in the present invention, the microstructure deviated from the range defined in the present invention. For this reason, as least one of impact characteristic and machinability did not reach its target.

To be specific, in the case of Test No. 24, the average grain diameter of ferrite in a region from the surface to a position at ½ radius in a cross-section perpendicular to the rolling direction was 13.3 μm, deviating from the range defined in the present invention. For this reason, the V-notch Charpy impact value was as low as 110 J/cm$^2$.

In the case of Test No. 25, the average grain diameter of ferrite, the area fraction of lamellar pearlite, and the number of particles of spheroidal cementite in a region from the surface to a position at ½ radius in a cross-section perpendicular to the rolling direction, and the average aspect ratio of ferrite grains in a region from the surface to a position at ½ radius in a cross-section including the center line and parallel to the rolling direction were 11.5 μm, 35.5%, 3.0×10$^5$/mm$^2$, and 2.3, respectively, deviating from the ranges defined in the present invention. For this reason, the V-notch Charpy impact value was as low as 90 J/cm$^2$.

In the case of Test No. 26, in a cross-section perpendicular to the rolling direction, the average grain diameter of ferrite in a region from the surface to a position at ½ radius, and the area fraction of lamellar pearlite and the number of particles of spheroidal cementite in a central part were 10.3 μm, 12.3%, and 7.5×10$^5$/mm$^2$, respectively, deviating from the ranges defined in the present invention. For this reason, the V-notch Charpy impact value was as low as 105 J/cm$^2$, and the torque when performing deep hole machining with a gun drill was as high as 450 N·cm.

In the case of Test No. 27, the average aspect ratio of ferrite grains in a region from the surface to a position at ½ radius in a cross-section including the center line and parallel to the rolling direction was 1.5, deviating from the range defined in the present invention. For this reason, the V-notch Charpy impact value was as low as 110 J/cm$^2$.

In the case of Test No. 28, in a cross-section perpendicular to the rolling direction, the area fraction of lamellar pearlite and the number of particles of spheroidal cementite in a central part were 11.5% and 4.5×10$^5$/mm$^2$, respectively, deviating from the ranges defined in the present invention. For this reason, the torque when performing deep hole machining with a gun drill was as high as 325 N·cm.

In the cases of Test Nos. 29 to 31, although the chemical compositions of Steels J, M, and P used satisfied the conditions defined in the present invention, the microstructures deviated from the range defined in the present invention. For this reason, one or more of impact characteristic and machinability did not reach its target.

To be specific, in the case of Test No. 29, the average grain diameter of ferrite, the area fraction of lamellar pearlite, and the number of particles of spheroidal cementite in a region from the surface to a position at ½ radius in a cross-section perpendicular to the rolling direction, and the average aspect ratio of ferrite grains in a region from the surface to a position at ½ radius in a cross-section including the center line and parallel to the rolling direction were 17.9 μm, 40.3%, 5.0×10$^4$/mm$^2$, and 1.5, respectively, deviating from the ranges defined in the present invention. For this reason, the V-notch Charpy impact value was as low as 75 J/cm$^2$.

In the case of Test No. 30, the average grain diameter of ferrite in a region from the surface to a position at ½ radius, and the area fraction of lamellar pearlite and the number of particles of spheroidal cementite in a central part in a cross-section perpendicular to the rolling direction were 11.2 μm, 5.3%, and 7.5×10$^5$/mm$^2$, respectively, deviating from the ranges defined in the present invention. For this reason, the V-notch Charpy impact value was as low as 100 J/cm$^2$, and the torque when performing deep hole machining with a gun drill was as high as 490 N·cm.

In the case of Test No. 31, the average aspect ratio of ferrite grains in a region from the surface to a position at ½ radius in a cross-section including the center line and parallel to the rolling direction was 1.4, deviating from the range defined in the present invention. For this reason, the V-notch Charpy impact value was as low as 105 J/cm$^2$. Note that while in this Test No., rolling in a range of 650 to 810° C. was conducted in Rough train and Finish train, and the cumulative reduction of area in the range of 650 to 810° C. was calculated as [(reduction of area in Rough train)+(100-cumulative reduction of area in Rough train and Intermediate train)× reduction of area in Finish train/100]. That is, the cumulative reduction of area in a range of 650 to 810° C. was given as [89.0+(100-92.3)×53.8/100]=93.1%.

Example 2

By using steel bars, each of which had a diameter of 34 mm, of Test Nos. 5, 10, 13, 16, 18, 25, 29, and 31 obtained in Example 1, a specimen simulating a rack bar was fabricated.

First, a steel bar having a diameter of 34 mm was subjected to shotpeening to remove surface scale, and thereafter was drawn into a diameter of 31 mm with lubricant oil applied to the surface thereof.

Figure 2:
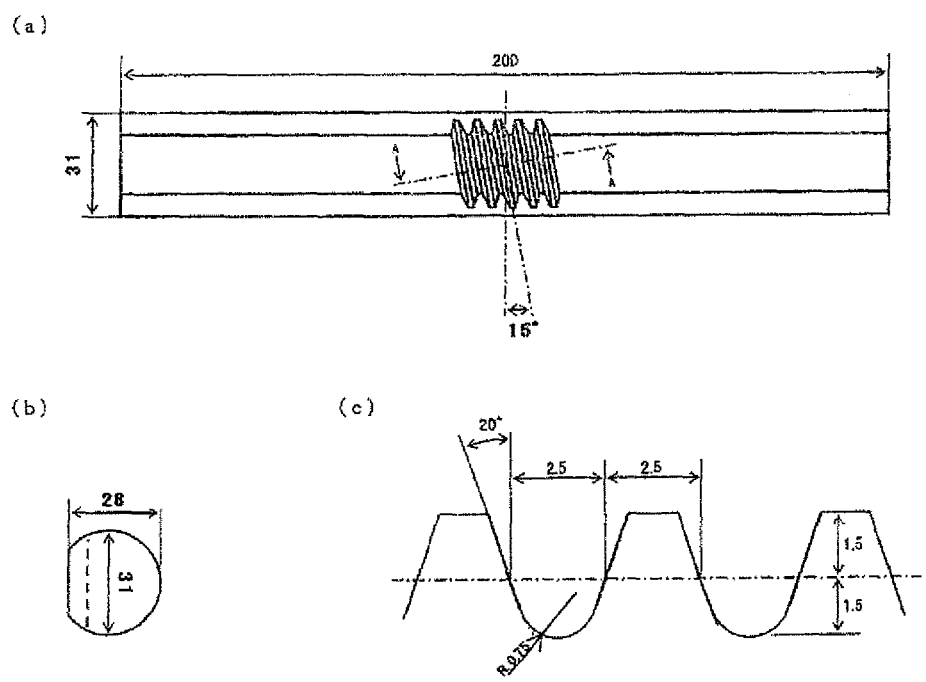
FIG. 2 illustrates the shape of a specimen taken from a drawn steel bar and simulating a steering rack bar used in a 3-point bending test of Example 2.

Next, the above described drawn material was processed into a specimen simulating a steering rack bar shown in FIG. 2.

Further, induction quenching was performed by widely adjusting the condition of induction quenching such that the depth of the hardened layer in an area corresponding to the tooth bottom of the rack bar (a depth from the surface, at which Vickers hardness is 450) be 1 mm. Thereafter, for the purpose of preventing cracking after induction quenching, tempering treatment was conducted at 180° C. for 2 hours.

Figure 3:
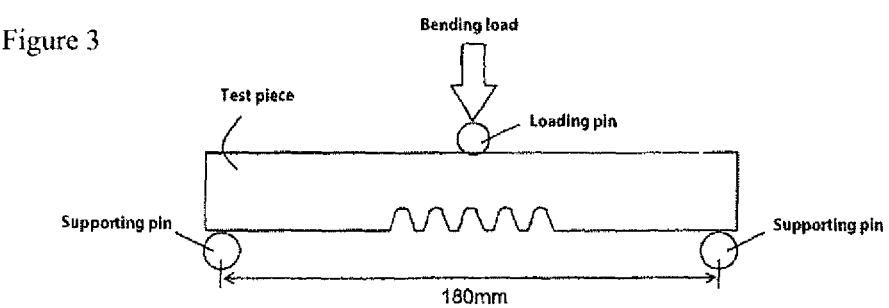
FIG. 3 schematically illustrates a 3-point bending test conducted in Example 2.

Next, using the specimen which had been subjected to the above described induction quenching and thereafter to tempering, 3-point bending test was performed at an interfulcrum distance of 180 mm and at a push-in speed of 1.0 mm/min as shown in FIG. 3, and a "load-stroke (push-in distance) curve" was acquired to determine "crack generation load" as a maximum load, that is, the load when a crack occurred, and thereby load showed a change.

Next, the specimen after the 3-point bending test was forced to rupture, and thereafter outward appearance of the ruptured surface was photographed, and the area fraction of the crack that propagated during the bending test was determined with respect to the total cross-section by image analysis processing to evaluate crack propagation resistance. Note that the target of damage prevention characteristic was set as that the area fraction of the crack that propagated during the above described bending test be not more than 30%.

Table 4 shows the results of each investigation described above. Note that "○" mark in the "Evaluation" column of Table 4 indicates that the area fraction of the crack that propagated during the bending test was not more than 30%, thus satisfying its target, and on the other hand, "×" mark indicates that the target was not satisfied.

TABLE 4

| Test No. | Steel | Test No, of steel bar produced in Example 1 | Crack generation load (N) | Area fraction of crack that propagated (%) | Total evaluation |
|---|---|---|---|---|---|
| 32 | E | 5 | 60 | 25 | ○ |
| 33 | J | 10 | 55 | 25 | ○ |
| 34 | M | 13 | 55 | 25 | ○ |
| 35 | P | 16 | 55 | 20 | ○ |
| 36 | *R | *18 | 60 | #85 | X |
| 37 | E | *25 | 50 | #65 | X |
| 38 | J | *29 | 55 | #70 | X |
| 39 | P | *31 | 50 | #80 | X |

* mark indicates deviation from the conditions defined in the present invention.
mark indicates that its target is unreached.

Table 4 reveals that in the case of steel bars of Test Nos. 32 to 35 which used steel bars of Test Nos. 5, 10, 13, and 16 that satisfied the conditions of chemical composition and microstructure defined in the present invention, their evaluations were "○" indicating that they had excellent characteristic, that is, the area fraction of the crack that propagated in the 3-point bending test was not more than 30%, without being subjected to thermal refining treatment.

In contrast to this, in the case of Test No. 36 which used the steel bar of Test No. 18, since its V-notch Charpy impact value was as low as 100 J/cm$^2$ as shown in Table 3, the area fraction of the crack that propagated during the 3-point bending test was as large as 85%, indicating poor damage prevention characteristic.

Similarly, in the case of Test No. 37 which used the steel bar of Test No. 25, since its V-notch Charpy impact value was as low as 90 J/cm$^2$ as shown in Table 3, the area fraction of the crack that propagated during the 3-point bending test was as large as 65%, indicating poor damage prevention characteristic.

Also in the case of Test No. 38 which used the steel bar of Test No. 29, since its V-notch Charpy impact value was as low as 75 J/cm$^2$ as shown in Table 3, the area fraction of the crack that propagated during the 3-point bending test was as large as 70%, indicating poor damage prevention characteristic.

Also in the case of Test No. 39 which used the steel bar of Test No. 31, since its V-notch Charpy impact value was as low as 105 J/cm$^2$ as shown in Table 3, the area fraction of the crack that propagated during the 3-point bending test was as large as 80%, indicating poor damage prevention characteristic.

INDUSTRIAL APPLICABILITY

Since the rolled round steel material for a steering rack bar of the present invention has high base metal toughness of an impact value of not less than 120 J/cm$^2$ at a test temperature of 25° C. in a Charpy impact test performed by using a V notch Charpy impact test specimen, and further exhibits excellent machinability for machining a deep hole in a central part thereof with a gun drill even without necessarily needing expensive V to be contained and further in a state of rolled round steel material even without being subjected to thermal refining treatment, it is suitable for use as the starting material for a steering rack bar.

Further, a steering rack bar of the present invention can be obtained by using the above described rolled round steel material for a steering rack bar in a non-thermally refined state.

The invention claimed is:

1. A rolled round steel material for a steering rack bar, comprising: a chemical composition consisting of, in mass %,
   C: 0.38 to 0.55%,
   Si: not more than 1.0%,
   Mn: 0.20 to 2.0%,
   S: 0.005 to 0.10%,
   Cr: 0.01 to 2.0%,
   Al: 0.003 to 0.10%,
   N: 0.003 to 0.03%,
   Cu: 0 to 1.0%,
   Ni: 0 to 3.0%,
   Mo: 0 to 0.50%,
   Ti: 0 to 0.10%,
   Nb: 0 to 0.10%,
   V: 0 to 0.30%,
   Ca: 0 to 0.005%, and
   Pb: 0 to 0.30%,
   with the balance being Fe and impurities, and
   P being not more than 0.030% in the impurities; and
   a microstructure consisting of ferrite, lamellar pearlite, and cementite, wherein in a cross-section perpendicular to a rolling direction:
   in a region from a surface to a position at ½ radius,
     an average grain diameter of the ferrite is not more than 10 μm,
     an area fraction of the lamellar pearlite is less than 20%, and
     a number of particles of spheroidal cementite among the cementite is not less than 4×10$^5$/mm$^2$; and
   in a central part,
     an area fraction of the lamellar pearlite is not less than 20%, and
     a number of particles of spheroidal cementite among the cementite is less than 4×10$^5$/mm$^2$, and wherein
   in a cross-section including a center line of the round steel material and parallel to the rolling direction:
   in a region from a surface to a position at ½ radius,
     an average aspect ratio of the ferrite grains is not less than 3.

2. The rolled round steel material for a steering rack bar according to claim 1, containing one or more elements selected from, in mass %, Cu: 0.10 to 1.0%, Ni: 0.10 to 3.0%, and Mo: 0.10 to 0.50%.

3. The rolled round steel material for a steering rack bar according to claim 1, containing one or more elements selected from, in mass %, Ti: 0.010 to 0.10%, Nb: 0.010 to 0.10%, and V: 0.010 to 0.30%.

4. The rolled round steel material for a steering rack bar according to claim 2, containing one or more elements selected from, in mass %, Ti: 0.010 to 0.10%, Nb: 0.010 to 0.10%, and V: 0.010 to 0.30%.

5. The rolled round steel material for a steering rack bar according to 6, containing one or more elements selected from, in mass %, Ca: 0.0005 to 0.005%, and Pb: 0.05 to 0.30%.

6. The rolled round steel material for a steering rack bar according to claim 2, containing one or more elements selected from, in mass %, Ca: 0.0005 to 0.005%, and Pb: 0.05 to 0.30%.

7. The rolled round steel material for a steering rack bar according to claim 3, containing one or more elements selected from, in mass %, Ca: 0.0005 to 0.005%, and Pb: 0.05 to 0.30%.

8. The rolled round steel material for a steering rack bar according to claim 4, containing one or more elements selected from, in mass %, Ca: 0.0005 to 0.005%, and Pb: 0.05 to 0.30%.

9. A steering rack bar, fabricated by using any of the rolled round steel materials for a steering rack bar according to 1 in a non-thermally refined state.

10. A steering rack bar, fabricated by using any of the rolled round steel materials for a steering rack bar according to claim 2 in a non-thermally refined state.

11. A steering rack bar, fabricated by using any of the rolled round steel materials for a steering rack bar according to claim 3 in a non-thermally refined state.

12. A steering rack bar, fabricated by using any of the rolled round steel materials for a steering rack bar according to claim 4 in a non-thermally refined state.

13. A steering rack bar, fabricated by using any of the rolled round steel materials for a steering rack bar according to claim 5 in a non-thermally refined state.

14. A steering rack bar, fabricated by using any of the rolled round steel materials for a steering rack bar according to claim 6 in a non-thermally refined state.

15. A steering rack bar, fabricated by using any of the rolled round steel materials for a steering rack bar according to claim 7 in a non-thermally refined state.

16. A steering rack bar, fabricated by using any of the rolled round steel materials for a steering rack bar according to claim 8 in a non-thermally refined state.

* * * * *